Patented Nov. 13, 1945

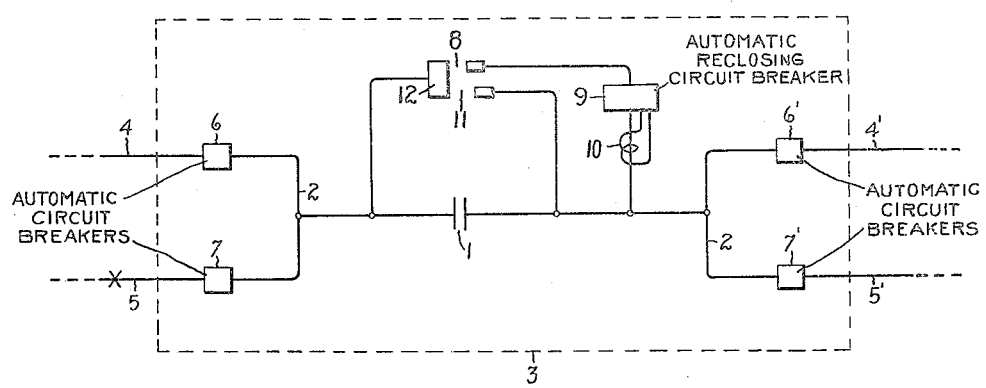

2,389,007

UNITED STATES PATENT OFFICE 2,389,007

PROTECTIVE SYSTEM

Harold E. Strang, Ardmore, Pa., and John W. Butler, Schenectady, N. Y., assignors to General Electric Company, a corporation of New York Application December 26, 1942, Serial No. 470,198

9 Claims. (Cl. 175—294)

This invention relates to electrical protective systems and more particularly to protective systems for series capacitors.

By the term "series capacitor" is usually meant an electrostatic condenser or a bank of such condensers which is connected in series in an alternating current power circuit, either directly or through a series transformer. The purpose of the series capacitor is to neutralize in whole or in part the inductance of the circuit. When the circuit is a high voltage, long distance transmission line which transmits power between synchronous dynamoelectric machines, the series capacitor materially increases the stability limits of the system; that is to say, it increases the amount of power the system can transmit before the machines at its terminals pull out of step, and it also increases the ability of the system to withstand electrical shocks such as those which arise from switching operations or from faults on the system.

As is well known, the voltage across a series capacitor is directly proportional to the current flow through it and as the fault current in a power system or the peak value of current during a transient load angle swing of the system will normally exceed the full load current of the system by many times, it would be very expensive to construct series capacitors which could safely withstand the high voltages corresponding to these high values of current. Consequently, it has been the usual practice to use relatively low voltage capacitors and provide them with protective equipment for effectively removing them from the circuit, such as by short-circuiting them, when the current through them exceeds the rated current of the system. However, the effective removal of the series capacitor means that the stability limits of the system are reduced. Consequently, it is desirable to reinsert the capacitor in the system as quickly as possible after the line current returns approximately to normal or at least to a value corresponding to the short time overload rating of the capacitor.

It has been proposed to provide time controlled means which will automatically reinsert the series capacitor in the circuit a predetermined time after it is short-circuited. This predetermined time is correlated to the time required for the conventional protective system of the circuit to clear a fault so that if everything operates as expeced the current will be back to normal at the time a capacitor is reinserted. However, if the fault has not been cleared or if a second fault occurs before the operation of the time controlled means for restoring the capacitor to the circuit, then the capacitor will be subjected to injurious overvoltage.

In accordance with the present invention, there is provided additional protective means having a different and higher setting than the first protective means for substantially instantaneously limiting the capacitor voltage in case abnormal conditions exist on the main circuit at the time that the capacitor is returned to service.

An object of the invention is to provide a new and improved electrical protective system.

Another object of the invention is to provide a new and improved series capacitor protective system.

A further object of the invention is to provide a new and improved alternating current power transmission system.

The invention will be better understood from the following description taken in connection with the accompanying drawing and its scope will be pointed out in the appended claims.

Referring now to the single figure of the accompanying drawing, there is shown therein diagrammatically an embodiment of the invention as applied to a series capacitor 1 which is connected between sectionalizing buses 2 in a switching station 3 of a sectionalized multi-circuit alternating current transmission line. This line may be considered as single phase or as one phase of a polyphase system. One circuit of the line is divided into sections 4 and 4' and the other circuit is divided into sections 5 and 5' and these circuit sections terminate in the switching station at normally closed automatic circuit breakers 6, 6', 7 and 7', and it should be understood that opposite ends of the circuit sections include similar circuit breakers located in other switching stations.

One of the principal purposes of the automatic circuit breakers is to isolate a fault on the line quickly so that the line may continue to transmit power with minimum disturbance to the system. The circuit breakers, therefore, include or are controlled by any suitable protective relays, the details of which are well known to those skilled in the art, and as those details form no part of this invention they have not been illustrated so as not to complicate the drawing unnecessarily. In general, their operation is such that whenever a fault occurs on any line section the circuit breakers at each end of the section open and thus isolate the fault by removing the faulted line section from the circuit or line. All the power then flows through the remaining sound section (or sections) which normally parallels the faulted section. There are numerous different principles on which these relays may operate to accomplish this result. For example, they may operate on the inverse time overcurrent principle. This is based on the fact that the magnitude of the overcurrent resulting from a fault is usually directly proportional to the nearness to the fault and that therefore the circuit breakers carrying the heaviest current will be in the same line section as the fault. Therefore, if the interrupting time of all the circuit breakers is inversely proportional to their overcurrent, the ones nearest the fault will operate first. Another principle is the power directional principle. This is based on the fact that normally the power flow through the line is in one direction or the other so that it is in the same direction in the circuit breakers at each end of any given line section. However, when a fault occurs, power flows into the fault from both ends of the faulted section so that the power flows in opposite directions through the circuit breakers at the ends of the faulted section. By means of carrier current or pilot wire control, an indication of this opposite direction of power flow in the two circuit breakers is communicated to both circuit breakers and they are caused to open. Still another principle is the so-called distance or impedance relaying principle. This is based on the fact that ordinarily the distance from any point on the line to a fault is proportional to the line impedance between the point and the fault. By means of relays which measure the ratio of line voltage to line current (impedance) the circuit breakers nearest the fault can be made to isolate it. In many cases two or more of these operating principles are combined and the equipment also functions to give what is called back-up protection. That is, if the nearest circuit breakers do not isolate the fault as soon as they should, other circuit breakers further away are operated so as to cut out a larger part of the circuit.

It should be understood that in large systems such, for example, as 220,000-volt transmission lines for transmitting large amounts of power hundreds of miles, the sectionalizing circuit breakers are very large pieces of equipment. Their moving parts, therefore, have considerable inertia, and therefore the faster they are to be operated the more power is required to operate them, and therefore the cost goes up very rapidly as the time of operation is decreased. At the present time the fastest circuit breakers in these large sizes operate to clear or interrupt the circuit in about three cycles ($\frac{1}{20}$ of a second, based on the usual system frequency of 60 cycles per second) after they receive the tripping impulse from the relaying equipment and the relays themselves usually require about one cycle after the occurrence of the fault in order to supply the tripping impulse to the circuit breakers.

However, the voltage across the series capacitor lags the current through it by only a quarter of a cycle so that upon the occurrence of overcurrent conditions in the transmission line the capacitor voltage will probably reach excessive values before it is possible for the line circuit breakers to come into action and reduce the overcurrent. In order to protect the capacitor against this rise in voltage it is shunted by a protective arc gap 8. Such a gap can be made to have no material time delay and to break down as soon as the voltage of the capacitor reaches its maximum safe value. It should, of course, be understood that the voltage across the gap 8 may either be the same as the voltage across the capacitor or it may be stepped up to higher values by any suitable voltage step-up means or voltage transforming means. Once the gap 8 arcs over the voltage required to maintain the arc will ordinarily be very much less than the breakdown voltage so that the capacitor current will ordinarily have to fall to a relatively low value which is substantially below the maximum safe capacitor current before the arc across the gap 8 will be extinguished without outside assistance. Therefore, even though the circuit current is not high enough to cause injurious capacitor overvoltages and even though it may be very desirable to have the capacitor back in the circuit it will remain effectively short-circuited by the arc gap.

In order to prevent this a normally closed automatic circuit breaker 9 is connected in series with the gap 8. This circuit breaker need not have as high a kva rating as the main line circuit breakers but its insulation to ground should be able to withstand the rated system voltage. It is provided with current responsive tripping means 10. The time required to interrupt the circuit of the gap 8 in response to the tripping means 10 is adjusted to be slightly longer than the time required by the main circuit breaker to clear the fault. For example, it can be an overall time of five or six cycles as compared with the overall interrupting time of four cycles for the main circuit breaker.

The circuit breaker 9 preferably includes conventional automatic reclosing means so that after it is opened means is set in motion for reclosing it.

However, the shortest time for large circuit breakers to go through a complete cycle of operation, that is to say, to go from closed to open to closed again, is ordinarily about twenty cycles and the cost of reducing this time substantially below this value would be prohibitive. Therefore, in order to protect the capacitor in case overcurrent conditions still exist on the main circuit after the time the circuit breaker 9 has opened the circuit across the capacitor, an additional protective device in the form of a second gap 11 is provided. This gap has a slightly higher voltage setting than the gap 8, as indicated by the slightly greater distance between its electrodes, or by other means well known in the art.

The gaps have been shown with a common electrode 12 and for reasons which will be explained hereinafter, the gap 8 is placed directly above the gap 11.

The operation of the illustrated embodiment of the invention is as follows. Assume that the system is operated at substantially rated current and that a fault, such as a short circuit or ground, occurs on the circuit section 5, as indicated by the X. The heavy current flowing to this fault through the capacitor 1 will raise its voltage, and when its voltage reaches a predetermined value the arc gap 8 arcs over. At substantially the same time operating means for the circuit breakers 7 and 9 go into action and, as previously explained, in about four cycles the circuit breaker 7 will have cleared thereby isolating the fault and permitting the line current to return to normal. A cycle or two later the circuit breaker 9 trips open, thereby interrupting the current through the arc and restoring the capacitor 1 to service.

Suppose, however, that for some reason the circuit breaker 7 failed to operate. Under these conditions the circuit breaker 9 would be tripped open before the circuit breakers 6' and 7' have time to open. Or suppose a second fault should develop on the circuit section 4 after the fault develops on section 5' and before the circuit breaker 9 has had time to open. Under either of these conditions the opening of the circuit breaker 9 will subject the capacitor 1 to excessive voltages and in order to prevent this the second gap 11 is arranged to arc over as soon as the voltage across the capacitor rises slightly above the voltage at which the gap 8 would arc over.

The gap 11, of course, has similar characteristics to the gap 8 so that the arc will tend to hang on across this gap until the main circuit current drops to a relatively low value. However, the reclosing of the circuit breaker 9 will connect the gap 8 across the same voltage that the gap 11 is connected across and as the gap 8 will be more or less ionized because its electrodes are directly above the arc between the electrodes of the gap 11, the arc will be transferred to the gap 8 and the arc across the gap 11 will go out. The current through the gap 8 will then start the circuit breaker 9 on a second cycle of operation so that after, say five cycles, the circuit breaker 9 will reopen and thus attempt to clear the arc across the gap 8. In this manner the automatic reclosing of the circuit breaker 9 serves to clear the arc in the gap 11 and the automatic tripping of the circuit breaker 9 serves to clear the arc in the gap 8. Such reclosing action can be repeated as often as engineering judgment may indicate is desirable.

While there has been shown and described a particular embodiment of this invention, it will be obvious to those skilled in the art that various changes and modifications can be made therein without departing from the invention, and therefore it is aimed in the appended claims to cover all such changes and modifications as fall within the true spirit and scope of the invention.

What we claim as new and desire to secure by Letters Patent of the United States is:

1. In combination, an alternating current power line, a series capacitor connected therein, a pair of arc gaps with unequal voltage settings effectively connected in parallel across said capacitor, a normally closed circuit interrupter connected in series with the gap having the lower voltage setting, automatic circuit breakers in said line for isolating a fault therein a predetermined time after its occurrence, and means for opening said interrupter in a predetermined time after its serially connected gap breaks down which is longer than the timing of said automatic circuit breakers.

2. In combination, an alternating current power line, a series capacitor connected therein, a pair of arc gaps with unequal voltage settings effectively connected in parallel across said capacitor, a normally closed circuit interrupter connected in series with the gap having the lower voltage setting, automatic circuit breakers in said line for isolating a fault therein a predetermined time after its occurrence, means for opening said interrupter in a predetermined time after its serially connected gap breaks down which is longer than the timing of said automatic circuit breakers, and means for reclosing said interrupter a predetermined time after it opens.

3. In combination, an alternating current power line, a series capacitor connected therein, a pair of arc gaps with unequal voltage settings effectively connected in parallel across said capacitor, a normally closed circuit interrupter connected in series with the gap having the lower voltage setting, means for opening said interrupter a predetermined time after its serially connected gap breaks down, and means for reclosing said interrupter a predetermined time after it opens, said gaps being so arranged that the gap with the lower setting is physically immediately above the gap with the higher setting whereby an arc across the gap with the higher setting will ionize the gap with the lower setting and will therefore readily transfer to the gap with the lower setting when said switch recloses.

4. In combination, an alternating current power line, a series capacitor connected therein, protective means for automatically clearing a fault on said line in a predetermined time after its occurrence, automatic means for effectively instantaneously short-circuiting said capacitor when its voltage reaches a predetermined value, means for opening said short circuit a predetermined time after said fault should have been cleared, and additional automatic means for effectively instantaneously short-circuiting said capacitor if its voltage exceeds said predetermined value.

5. In combination, an alternating current power line, a series capacitor connected therein, protective means for automatically clearing a fault on said line in a predetermined time after its occurrence, automatic means for effectively instantaneously short-circuiting said capacitor when its voltage reaches a predetermined value, means for opening said short circuit a predetermined time after said fault should have been cleared, and additional automatic means for again short-circuiting said capacitor if its voltage exceeds a safe value.

6. In combination, a multi-circuit sectionalized alternating current power line, automatic circuit breakers in each end of each circuit section, a series capacitor connected in said line between two adjacent sections, substantially instantaneously acting means for effectively removing said capacitor from said line when its voltage rise approaches but does not reach a predetermined value, automatic means for effectively reinserting said capacitor in said line in a predetermined time after its effective removal, and additional substantially instantaneously acting means for effectively removing said capacitor from said line if its voltage rises above said predetermined value.

7. In combination, an alternating current power circuit, a series capacitor connected therein, a plurality of spaced automatically operated circuit breakers in said circuit so correlated that the breaker nearest a fault will normally trip first to clear the fault and if it fails to trip in a predetermined time the next nearest breaker will trip thereby to provide back-up protection for the system, means for short-circuiting said capacitor substantially instantaneously upon the occurrence of a fault, means for opening said short circuit as soon as the circuit breaker nearest the fault has had time to open, and additional means for short-circuiting said capacitor substantially instantaneously after the first short circuit is opened if the circuit breaker nearest the fault has failed to open.

8. In combination, an alternating current power circuit, a series capacitor connected therein, a plurality of spaced automatically operated circuit breakers in said circuit so correlated that the breaker nearest a fault will normally trip first to clear the fault and if it fails to trip in a predetermined time the next nearest breaker will trip thereby to provide back-up protection for the system, means for short-circuiting said capacitor substantially instantaneously upon the occurrence of a fault, means for opening said short circuit as soon as the circuit breaker nearest the fault has had time to open, and additional means for short-circuiting said capacitor substantially instantaneously after the first short circuit is opened if the line is still faulted.

9. In combination, an electrical device, an arc gap for short-circuiting said device substantially instantaneously when its voltage reaches a predetermined high value, a normally closed automatic reclosing type circuit breaker connected in circuit with said gap, means responsive to current through said gap for opening said circuit breaker, and a second arc gap for short-circuiting said device substantially instantaneously if its voltage exceeds the voltage setting of the first gap when said circuit breaker opens, said gap being so placed that an arc across said second gap transfers to said first gap when said circuit breaker recloses whereby the operating cycle of said circuit breaker tends to clear both gaps.

HAROLD E. STRANG.
JOHN W. BUTLER.